Feb. 6, 1968  D. W. TREBLE  3,367,352
LOWEST CONTROL SIGNAL SELECTOR
Filed Feb. 7, 1964
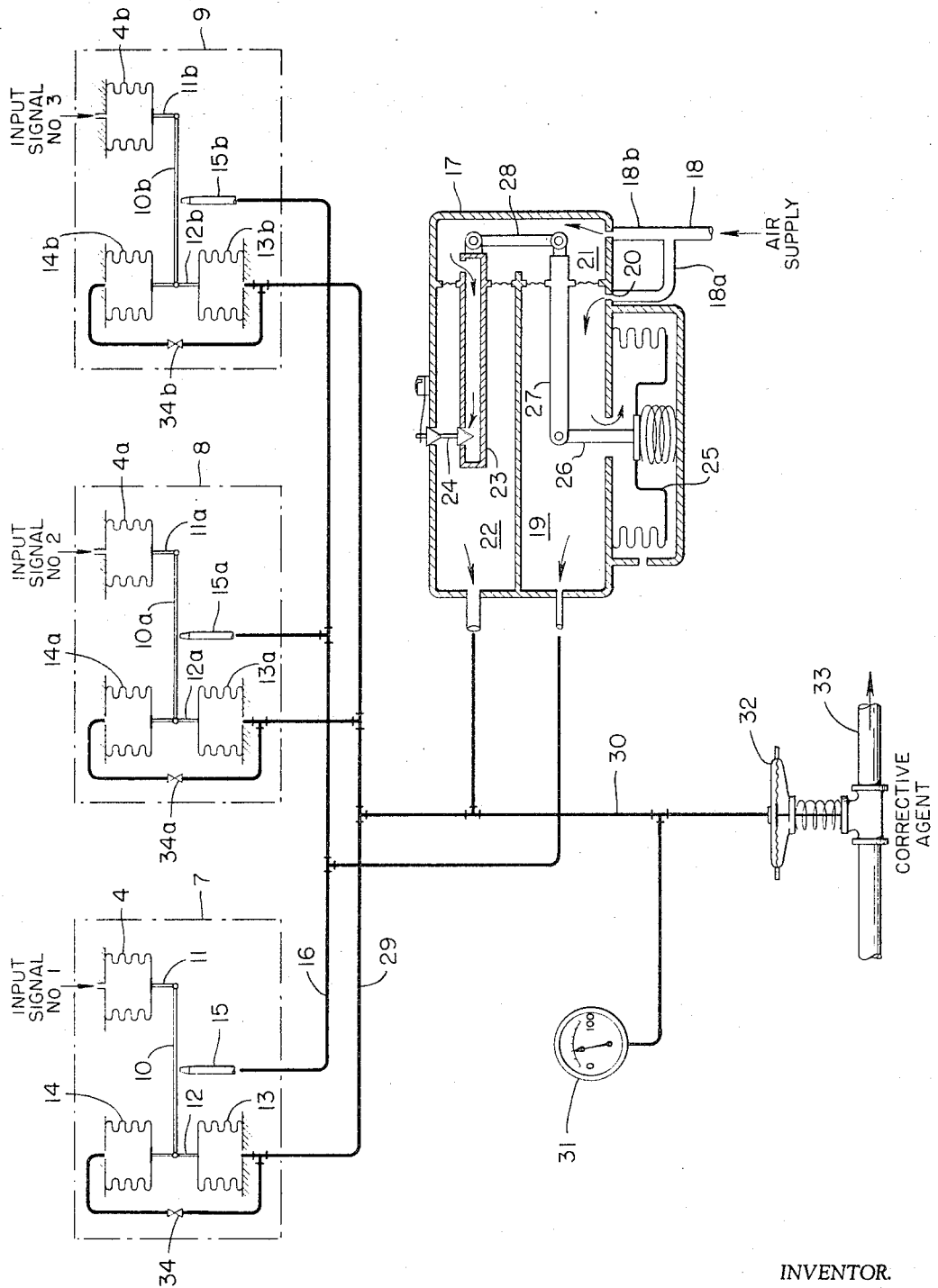
INVENTOR.
DONALD W. TREBLE
BY
John F. Luhrs
ATTORNEY United States Patent Office 3,367,352
Patented Feb. 6, 1968

3,367,352
LOWEST CONTROL SIGNAL SELECTOR
Donald W. Treble, Sudbury, Ontario, Canada, assignor to Bailey Meter Company, a corporation of Delaware
Filed Feb. 7, 1964, Ser. No. 343,365
Claims priority, application Canada, Nov. 26, 1963, 889,910
4 Claims. (Cl. 137—86)

This invention relates to a system for selecting the lowest of several signals. More particularly this invention relates to a system for generating a pneumatic control signal corresponding to the lowest one of several input signals which may be pneumatic, electric, hydraulic, or mechanical in origin.

In control systems such as found in power plants and industrial processes, it is frequently desirable to control a corrective agent in accordance with the one of several variables having the lowest or highest relative value. For example, in a combustion control system for a vapor generator it is desirable to control the fuel flow in accordance with the rate of air flow or in accordance with the demand for vapor, whichever calls for the lower rate of fuel flow. By so doing the rate of fuel flow is prevented from exceeding the available air supply or the demand for vapor. In a pulp and paper mill it is desirable that a flow of steam to a digester, for example, normally be controlled to maintain a predetermined time-temperature relationship, but to limit the steam flow so that it will not, during start-up or upset conditions, exceed a predetermined rate. These are but two examples of a problem frequently encountered in the control of power plants and industrial processes.

It is an object of my invention to provide a control system which selects a unique one of several available signals for the control of a corrective agent.

More specifically it is an object of my invention to provide a control system which generates a pneumatic control signal in accordance with a selected one of several available input signals.

Still another object of my invention is to provide a control system for selecting a unique one of several input signals utilizing standard components readily available in commercial form.

These and other objects will be apparent from the following description and from the drawing which illustrates in schematic form one specific embodiment of my invention.

In the drawing I have shown my novel signal selector adapted to receive pneumatic input signals 1, 2 and 3 as being representative of the fact that the selector is capable of selecting a unique one of two or more input signals. While pneumatic input signals are employed in the embodiment of my invention illustrated in the drawing, it is evident that by suitable converters such pneumatic input signals may be derived from electric, hydraulic or mechanical signal sources.

Input signals 1, 2 and 3 are introduced into pressure responsive bellows 4, 4a and 4b of relays 7, 8 and 9 respectively. The relays are identical in construction and may be, for example, of a type similar to that illustrated and described in United States Patent 2,805,678 to Michael Panich. As relays 7, 8 and 9 are identical, corresponding parts bearing number identification for relay 7 will be identified by the same number followed by the letter a for the relay 8 and the letter b for the relay 9.

The relay 7 includes a vane 10 pivoted between push rod 11 and a link 12 which is secured to the opposed movable walls of a pressure responsive feedback bellows 13 and a pressure responsive reset bellows 14. Forming a control couple with the vane 10 is a nozzle 15.

The nozzles 15, 15a and 15b of relays 7, 8 and 9 respectively are connected in parallel by a conduit 16 to a booster relay 17 which may be of the type illustrated and described in United States Patent 2,737,963 to Harvard H. Gorrie. Compressed air is supplied the relay at substantially constant pressure from any suitable source (not shown) through a pipe 18 having a branch 18a leading to a chamber 19 to which the conduit 16 is connected. Disposed in the branch 18a at the entrance to chamber 19 is a restriction 20. The pressure existing in conduit 16 is therefor a function of the relative positions of vane 10 and nozzle 15. That is to say, as the vane 10, for example, approaches the nozzle 15 decreasing the discharge from the nozzle, a proportionate increase in pressure will occur in conduit 16 and vice versa. The conduit 18 also has a branch 18b leading to a chamber 21 in communication with a chamber 22 through a tiltable hollow tube 23 extending from the chamber 21 to the chamber 22 through a flexible diaphragm. A supply and waste valve 24 operated by tube 23 controls the flow into and out of chamber 22.

In communication with the chamber 19 is a spring opposed pressure sensitive bellows 25 to the movable wall of which is secured a push rod 26 carrying a pivoted link 27 which extends into the chamber 21 through a flexible diaphragm. A link 28 pivotally connects link 27 to hollow tube 23. An increase in pressure in chamber 19 will effect a counter clockwise positioning of pivoted link 27 and hollow tube 23 thereby permitting compressed air to enter chamber 22 to increase the pressure therein. A decrease in pressure in chamber 19 will cause a clockwise positioning of pivoted link 27 and hollow tube 23 thereby shutting off the flow of compressed air to chamber 22 and permitting the escape of air therefrom through the supply and waste valve 24 to decrease the pressure therein.

A conduit 29 connects the feedback bellows 13, 13a and 13b to the chamber 22. Also connected to the chamber 22 through a conduit 30 is a read-out device, herein specifically illustrated as an indicating pressure gauge 31 and a final control element specifically illustrated as a valve 32 adapted to regulate the rate of flow of a corrective agent, such as steam, through a pipe 33.

Assuming momentarily that only the relay 7 is present an increase of pressure within bellows 4 will cause the vane 10 to move toward the nozzle 15 increasing the pressure in conduit 16 and chamber 19. Supply and waste valve 24 will be operated by virtue of the operation of bellows 25 and associated parts to allow compressed air to flow into chamber 22 and through conduit 29 into bellows 13. As the pressure in bellows 13 increases vane 10 will move away from nozzle 15 and equilibrium will be restored when the increase in pressure in bellows 13 is proportional to the initial increase in pressure in bellows 4. The reverse operation will occur upon decrease in pressure within bellows 4.

Considering now the operation with relays 8 and 9 active as well as the relay 7, and assuming the pressure in bellows 4 to be less than that in the bellows 4a and 4b, vanes 10a and 10b will substantially shut off the discharge of air from nozzles 15a and 15b as relay 7 will operate to maintain a lower pressure in conduit 16 than that necessary to maintain relays 8 and 9 in equilibrium. Thus, under this condition the control pressure in conduit 30, transmitted to valve 32, will be proportional to input signal 1. If at any time the input signal to relay 8 or relay 9 becomes the lowest then this signal will determine the control pressure transmitted to final control element 32.

In the control art it is customary to speak of bellows 13, 13a and 13b of relays 7, 8 and 9 respectively, as feedback bellows in that they feed back into their associated relays a signal corresponding to the output signals generated thereby. The output of the relay so far described is proportional to the input signal thereto. As common in the art, the relays 7, 8 and 9 may be provided with an adjustment whereby the ratio between the change in input signal and corresponding change in output signal can be varied. This is commonly defined as a "gain" adjustment.

In some applications of my signal selector in order to obtain higher sensitivity and to maintain the input signal effective for control of the corrective agent through final control element 32 at a predetermined or "set point" value relays 7, 8 and 9 may be provided with reset bellows 14, 14a and 14b connected to the feedback bellows 13, 13a and 13b through adjustable restrictions 34, 34a and 34b respectively. Such reset bellows gradually remove the effect of the feedback bellows 13 causing a gradual increase or decrease in the output signal of the relay depending upon the sense of departure of the input signal from the predetermined or "set point" value. The reset bellows, it may be said, provides a regenerative action causing a continual change in the output signal and accordingly in the rate of flow of corrective agent in a direction to restore the relay 7 to a state of equilibrium corresponding to the predetermined value of the input signal and of the variable generating that signal. It will be observed, however, that the pressure present in the feedback and reset bellows of all of the relays will be determined by the output signal generated by the relay sensitive to the lowest input signal. Thus, at the point of crossover where another input signal becomes the lowest there will be no "bump" in output signal occasioned by transfer of activity from one relay to another.

While I have illustrated and described my invention by means of one embodiment it will be understood that this is by way of explanation only and I do not desire to be limited thereby.

What I claim as new and desire to secure by Letters Patent of the United States is:

1. Apparatus for producing a pneumatic control pressure corresponding to a particular one of a plurality of input signals, comprising in combination, a plurality of control couples each comprising a nozzle and vane, means for relatively positioning the nozzle and vane of each couple in accordance with changes in the magnitude of a separate one of the input signals, a conduit connecting all of the nozzles of said control couples in parallel to a common source of pneumatic pressure, a restriction in said conduit between the source of pneumatic pressure and said nozzles, a negative feedback bellows operatively connected to each of said control couples responsive to the pressure in said conduit between said restriction and said nozzles relatively moving the nozzle and vane away and toward each other in response to increases and decreases respectively in said pressure whereby the pressure in said conduit between said restriction and said nozzles is determined by the control couple having the greatest distance between its nozzle and vane, each of said control couples is provided with a positive feedback reset bellows responsive to the pressure in said conduit downstream of said restriction for relatively moving the nozzle and vane toward and away from each other in response to increases and decreases respectively in the pressure in said conduit, a booster relay connected between said conduit downstream of said restriction and said feedback bellows to thereby provide an amplified fluid pressure for operating said feedback bellows.

2. Apparatus as set forth in claim 1 including measuring means responsive to the amplified fluid pressure provided by said booster relay.

3. In a pneumatic control system for controlling the rate of supply of a corrective agent in accordance with the smallest of a plurality of pneumatic input signals, comprising in combination, a plurality of control couples each having a nozzle and vane relatively positioned toward and away from each other by a separate one of the input signals as the input signal increases and decreases respectively, a conduit connecting all of said nozzles in parallel to a common source of pneumatic pressure, a restriction in said conduit between the source of pneumatic pressure and said nozzles, a negative feedback bellows operatively connected to each of said control couples responsive to the pressure in said conduit between said restriction and said nozzles for relatively moving the nozzle and vane away and toward each other as the pressure in said conduit increases and decreases respectively, whereby the relative distance between the nozzle and vane of each control couple is minimized except for the control couple having the greatest distance between its nozzle and vane and the pressure between said restriction and said nozzles is determined by said last named couple, and means responsive to the pressure between said restriction and said nozzles adjusting the rate of supply of the corrective agent, each of said control couples is provided with a positive feedback bellows having a restricted connection to said negative feedback bellows for relatively moving the nozzle and vane toward and away from each other as the pressure in said conduit increases and decreases respectively, a booster relay connected between said conduit downstream of said restriction and said feedback bellows to thereby provide an amplified fluid pressure for operating said feedback bellows.

4. In a control system as set forth in claim 3 including measuring means operated by the amplified fluid pressure provided by said booster relay.

References Cited
UNITED STATES PATENTS

| | | | |
|---|---|---|---|
| 2,476,104 | 7/1949 | Mason | 137—86 XR |
| 2,805,678 | 9/1957 | Panich | 137—86 |
| 3,020,490 | 2/1962 | Kleiss | 137—86 XR |
| 3,223,105 | 12/1965 | Hogel | 137—85 |

ALAN COHAN, *Primary Examiner.*